(12) United States Patent
Zheng (10) Patent No.: US 7,611,803 B2
(45) Date of Patent: Nov. 3, 2009

(54) ELECTROCHEMICAL CELL

(75) Inventor: Guanghong Zheng, Avon, OH (US)

(73) Assignee: Eveready Battery Co., Inc., St. Louis, MO (US)

( * ) Notice: Subject to any disclaimer, the term of this patent is extended or adjusted under 35 U.S.C. 154(b) by 0 days.

(21) Appl. No.: 11/003,553

(22) Filed: Dec. 3, 2004

(65) Prior Publication Data

US 2006/0121347 A1 Jun. 8, 2006

(51) Int. Cl.
- *H01M 4/58* (2006.01)
- *H01M 4/50* (2006.01)
- *H01M 4/62* (2006.01)
- *H01M 4/42* (2006.01)
- *H01M 10/26* (2006.01)

(52) U.S. Cl. .................. 429/229; 429/218.1; 429/206; 429/225; 429/220; 429/231.6; 429/224; 429/232

(58) Field of Classification Search ................ 429/229, 429/218.1, 206
See application file for complete search history.

(56) References Cited

U.S. PATENT DOCUMENTS

| | | | |
|---|---|---|---|
| 3,893,870 A * | 7/1975 | Kozawa ..................... 429/57 |
| 4,847,174 A * | 7/1989 | Palmer et al. ............... 429/112 |
| 5,069,988 A * | 12/1991 | Tomantschger et al. ....... 429/59 |
| 6,497,973 B1 * | 12/2002 | Amendola .................... 429/19 |
| 6,730,436 B2 * | 5/2004 | Wang et al. ................. 429/220 |
| 2002/0098398 A1 * | 7/2002 | Chen .......................... 429/18 |
| 2003/0049530 A1 * | 3/2003 | Wang et al. ................. 429/220 |
| 2003/0082437 A1 * | 5/2003 | Sotomura ................... 429/111 |
| 2004/0038090 A1 * | 2/2004 | Faris ........................... 429/12 |
| 2005/0074674 A1 * | 4/2005 | Boone et al. ............... 429/247 |
| 2005/0136328 A1 * | 6/2005 | Eylem et al. ............... 429/220 |

\* cited by examiner

*Primary Examiner*—Patrick Ryan
*Assistant Examiner*—Angela J. Martin
(74) *Attorney, Agent, or Firm*—Russell H. Toye, Jr.

(57) ABSTRACT

An alkaline electrochemical cell having an anode containing zinc and a cathode that includes a catalyst and an iodate is disclosed. The catalyst catalyzes the reduction of the iodate when the cell is discharged thereby enabling the cell to be used in devices that have a functional endpoint of 1.0V or higher. Preferred catalysts include platinum and palladium. Suitable iodates include copper iodate, strontium iodate and lead iodate.

16 Claims, 6 Drawing Sheets

ELECTROCHEMICAL CELL

BACKGROUND OF THE INVENTION

This invention generally relates to an electrochemical cell having an iodate in the cathode. More particularly, this invention is concerned with an alkaline electrochemical cell having an iodate and a catalyst in the cathode.

Alkaline electrochemical cells are commercially available in several standard sizes such as LR03, LR6, LR14 and LR20 which are also referred to as AAA, AA, C and D size batteries, respectively. The cells have a cylindrical shape that must comply with dimensional standards that are set by organizations such as The International Electrotechnical Commission. The cells are used by consumers to power a range of products such as cameras, compact disc players, clocks, etc. A typical cell construction includes a cylindrical container that houses an anode, a cathode, electrolyte and a separator which is positioned between the anode and the cathode.

Despite the volumetric limitations imposed by the dimensional standards, battery manufacturers constantly strive to increase the length of time that a cell, also known herein as a battery, will power a device. The cathode is one of the battery's key components that must be improved in order to provide a longer running battery. Most commercially available cylindrical alkaline batteries utilize electrolytic manganese dioxide (EMD) in the cathode as the electrochemically active material. Unfortunately, the volumetric capacity of EMD, based on a one electron reaction, is only 1540 mAh/cc which is much lower than the volumetric capacity of zinc which is 5800 mAh/cc. In order to increase the cell's run time, the useable electrochemical capacity of the cathode must be increased. One way to increase the electrochemical capacity of the cathode is to replace the EMD with another active cathode material with a volumetric capacity substantially greater than 1540 mAh/cc. For example, replacing the EMD with an iodate, such as lead iodate which has a volumetric capacity of 3,753 mAh/cc, would accomplish the objective of increasing the cathode's volumetric capacity. However, when zinc and lead iodate are coupled within a cell as opposing electrochemically active materials and the cell is discharged on a light load, such as 5 mA/g of the cathode's electrochemically active material, the cell's average running closed circuit voltage (CCV) is typically between 0.6 V and 0.8 V which is significantly lower than the thermodynamic voltage. The low CCV is believed to be due to sluggish reaction kinetics. Unfortunately, many devices that are powered by cylindrical alkaline cells cannot operate if the cell's voltage is below 0.9 V. The voltage below which a device cannot operate is commonly known as the device's functional endpoint. Many devices, such as digital still cameras and minidisk players, have functional endpoints of 1.0 V or higher. Therefore, an iodate cannot be directly substituted for EMD in cylindrical alkaline cells having an anode containing zinc because the cell's CCV is too low.

Previous attempts to utilize a cathode containing an iodate in an alkaline cell include U.S. Pat. No. 6,730,436 which discloses an alkaline cell having an anode comprising zinc and a cathode comprising copper iodate. However, in the subject patent's TABLE 1, cells made with a cathode containing copper iodate and (1) expanded graphite or (2) graphitic carbon nanofibers or (3) expanded graphite and sulfur, had average running voltages of 0.5 V, 0.6 V and 0.9 V, respectively. This patent does not teach how to manufacture an alkaline cell with a cathode comprising an iodate and an anode comprising zinc, wherein the cell, when discharged, has an average running voltage equal to or greater than 1.0 V which is the minimum closed circuit voltage needed to power many commercially available devices.

Therefore, there exists a need for an alkaline electrochemical cell that utilizes a cathode comprising an iodate, an anode comprising zinc and the cell can be discharged at 1.0 V or higher.

BRIEF SUMMARY OF THE INVENTION

In one embodiment, the electrochemical cell of the present invention includes a first electrode, a second electrode having an iodate and a catalyst that catalyzes the reduction of the iodate, a separator disposed between the electrodes and an electrolyte that provides ionic conductivity between the first and second electrodes.

DETAILED DESCRIPTION OF THE INVENTION

Figure 1:
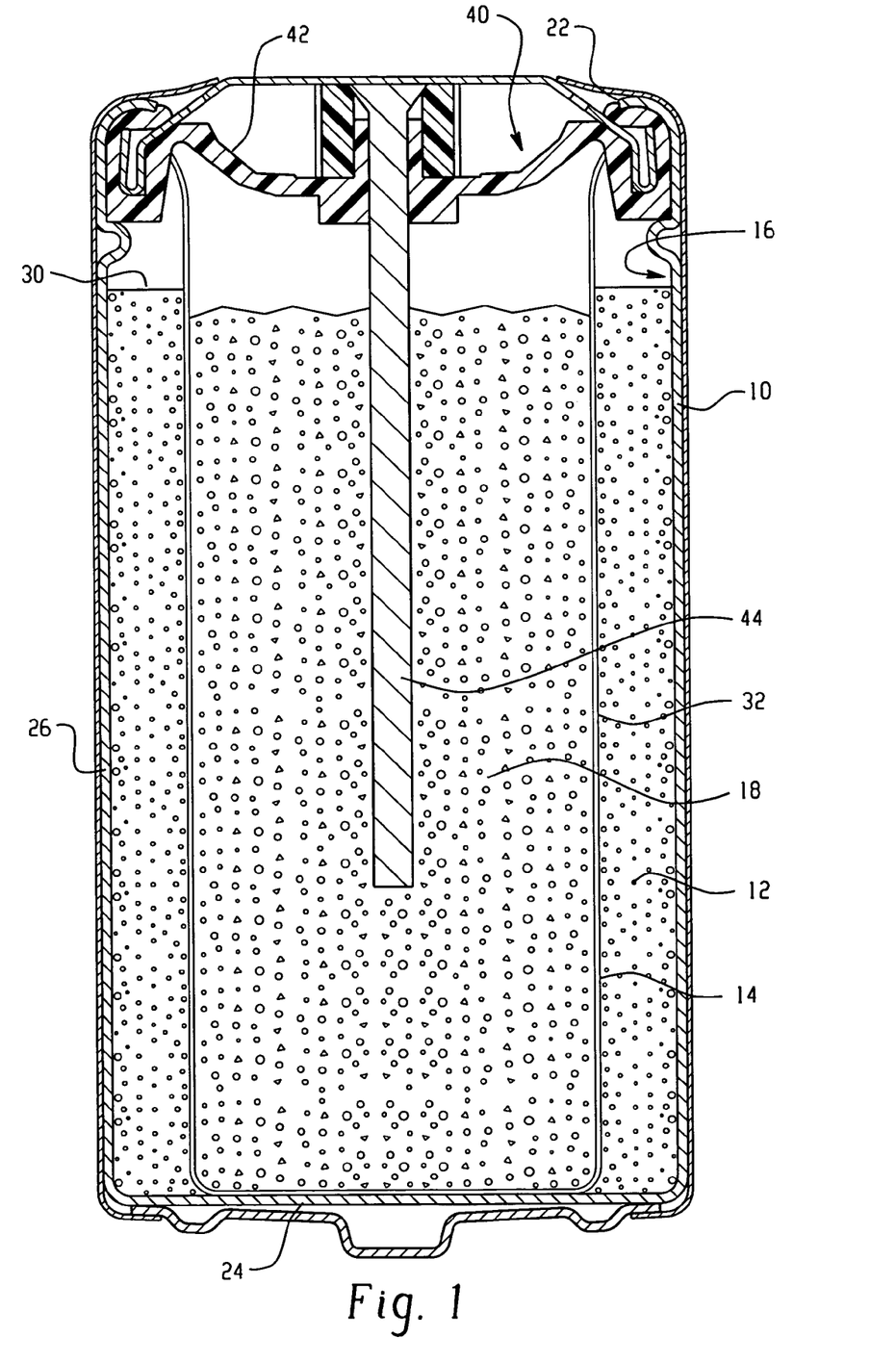
FIG. 1 is an electrochemical cell of this invention.

Referring now to the drawings and more particularly to FIG. 1, there is shown a cross-sectional view of an assembled electrochemical cell of this invention. Beginning with the exterior of the cell, the cell's components are the container 10, second electrode 12 positioned adjacent the interior surface of container 10, separator 14 contacting the interior surface 16 of second electrode 12, first electrode 18 disposed within the space defined by separator 14 and closure assembly 40 secured to container 10. Container 10 has an open end 22, a closed end 24 and a sidewall 26 therebetween. The closed end 24, sidewall 26 and closure assembly 40 define a cavity in which the cell's electrodes are housed.

First electrode 18 is a homogenous mixture of an aqueous alkaline electrolyte, zinc powder, and a gelling agent such as crosslinked polyacrylic acid. The aqueous alkaline electrolyte comprises an alkaline metal hydroxide such as potassium hydroxide, sodium hydroxide, or mixtures thereof. Potassium hydroxide is preferred. The gelling agent suitable for use in a cell of this invention can be a crosslinked polyacrylic acid, such as Carbopol 940®, which is available from Noveon, Cleveland, Ohio, USA. Carboxymethyylcellulose, polyacrylamide and sodium polyacrylate are examples of other gelling agents that are suitable for use in an alkaline electrolyte solution. The zinc powder may be pure zinc or an alloy comprising an appropriate amount of one or more of the metals selected from the group consisting of indium, lead, bismuth, lithium, calcium and aluminum. A suitable anode mixture contains 67 weight percent zinc powder, 0.50 weight percent gelling agent and 32.5 weight percent alkaline electrolyte having 40 weight percent potassium hydroxide. The quantity of zinc can range from 63 percent by weight to 70 percent by weight of the anode. Other components such as gassing inhibitors, organic or inorganic anticorrosive agents, binders or surfactants may be optionally added to the ingredients listed above. Examples of gassing inhibitors or anti-corrosive agents can include indium salts (such as indium hydroxide), perfluoroalkyl ammonium salts, alkali metal sulfides, etc. Examples of surfactants can include polyethylene oxide, polyethylene alkylethers, perfluoroalkyl compounds, and the like.

The first electrode may be manufactured by combining the ingredients described above into a ribbon blender or drum mixer and then working the mixture into a wet slurry.

Second electrode 12 is a mixture that includes at least an iodate and a catalyst that catalyzes the reduction of the iodate when the cell is discharged. The second electrode is formed by disposing a quantity of the mixture into the open ended container and then using a ram to mold the mixture into a solid tubular shape that defines a cavity which is concentric with the sidewall of the container. Second electrode 12 has a shelf 30 and an interior surface 32. Alternatively, the second electrode, which is also known as the cathode, may be formed by preforming a plurality of rings from the mixture comprising the iodate and the catalyst and then inserting the rings into the container to form the tubularly shaped second electrode.

In the cell shown in FIG. 1, separator 14 may be a layered ion permeable, non-woven fibrous fabric which separates the anode (first electrode) from the cathode (second electrode). A suitable separator is described in WO 03/043103. The separator maintains a physical dielectric separation of the second electrode's electrochemically active material (iodate) and the first electrode's electrochemically active material (zinc) while allowing for the transport of ions between the electrode materials. In addition, the separator acts as a wicking medium for the electrolyte and as a collar that prevents fragmented portions of the anode from contacting the top of the cathode. A typical separator usually includes two or more layers. Conventional separators are usually formed either by preforming the separator material into a cup-shaped basket that is subsequently inserted into the cavity defined by the second electrode or forming a basket during cell assembly by inserting into the cavity two rectangular sheets of separator material angularly rotated ninety degrees relative to each other. The conventional preformed separators are typically made up of a sheet of non-woven fabric rolled into a cylindrical shape that conforms to the inside walls of the second electrode and has a closed bottom end.

Electrolyte suitable for use in a cell of this invention is a thirty-seven percent by weight aqueous solution of potassium hydroxide. Alkaline electrolytes that are made with sodium hydroxide or lithium hydroxide are also possible. The electrolyte may be incorporated into the cell by disposing a quantity of the fluid electrolyte into the cavity defined by the second electrode. The electrolyte may also be introduced into the cell by allowing the first electrode's gelling medium to absorb an aqueous solution of potassium hydroxide during the process used to manufacture the first electrode. The method used to incorporate electrolyte into the cell is not critical provided the electrolyte is in contact with the first electrode 18, second electrode 12 and separator 14.

Closure assembly 40 comprises closure member 42 and current collector 44. Closure member 42 is molded to contain a vent that will allow the closure member to rupture if the cell's internal pressure becomes excessive. Closure member 42 may be made from Nylon 6,6 or another material, such as a metal, provided the current collector 44 is electrically insulated from the container 10 which serves as the current collector for the second electrode. Current collector 44 is an elongated nail shaped component made of brass. Collector 44 is inserted through a centrally located hole in closure member 42.

Second electrode 12 will now be described in greater detail. In cells of this invention, second electrode 12 must include an iodate containing compound and a catalyst that facilitates the reduction of the iodate when the cell is discharged. Suitable iodates include lead iodate, strontium iodate, copper iodate, barium iodate, silver iodate, potassium iodate, lithium iodate, ferrous iodate, bismuth iodate, cerium iodate, zinc iodate and calcium iodate. As shown in Table 1, these compounds have volumetric capacities that are significantly greater than the volumetric capacity of electrolytic manganese dioxide (EMD) which is commonly used in commercially available cylindrical alkaline cells.

TABLE 1

| Electrochemically Active Material | Faradays per Formula Unit* (F/mol) | Volumetric Capacity (mAhr/cc) |
| --- | --- | --- |
| Lead Iodate | 12 | 3753 |
| Strontium Iodate | 12 | 3709 |
| Copper Iodate | 12 | 4077 |
| Barium Iodate | 12 | 2965 |
| Silver Iodate | 7 | 3668 |
| Calcium Iodate | 12 | 3727 |
| Potassium Iodate | 6 | 2953 |
| Lithium Iodate | 6 | 3979 |
| Zinc Iodate | 12 | 3919 |
| Ferrous Iodate | 12 | 2659 |
| Bismuth Iodate | 18 | 4044 |
| Cerium Iodate | 24 | 4098 |
| Manganese Dioxide (EMD) | 1 | 1540 |

*Assuming a six-electron reduction from iodate to iodide.

The use of iodates in an alkaline electrochemical cell to replace all or part of the EMD is desirable for two reasons. First, relative to a cell that contains only EMD as the cathode's electrochemically active material, the iodate's higher volumetric capacity enables longer run times when the cell is discharged. Second, when an iodate is discharged versus zinc in an alkaline electrolyte, the chemical reaction does not utilize water as one of the reactants thereby eliminating the need to design a cell with sufficient water to enable complete discharge of the EMD and zinc. By eliminating the consumption of water in the cathode during discharge, more volume within the cell can be allocated to additional inputs of electrochemically active materials. Cells of this invention may contain only an iodate as the electrochemically active material in the cathode or the cathode may contain two or more iodates or the cathode may contain an iodate and another dischargeable material such as EMD or silver oxide.

Iodate containing compounds suitable for use in cells of this invention are available from commercial suppliers such as Alfa Aesar of 26 Parkridge Road, Ward Hill, Mass., USA and Sigma Aldrich of 3050 Spruce Street, St. Louis, Mo., USA. One important characteristic to consider when selecting an iodate is the material's BET (Brunauer, Emmett and Taylor) surface area which is well known in the art as a standard measurement of particulate surface area as measured by gas porosimetry. While iodates having a surface area of approximately 0.4 $m^2/g$ are usable, iodates with higher surface areas, such as 4 $m^2/g$, 15 $m^2/g$, 35 $m^2/g$, 50 $m^2/g$, 75 $m^2/g$, 100 $m^2/g$ or higher are preferred. Iodates with a surface area as low as 0.1 $m^2/g$ may be acceptable.

Figure 2:
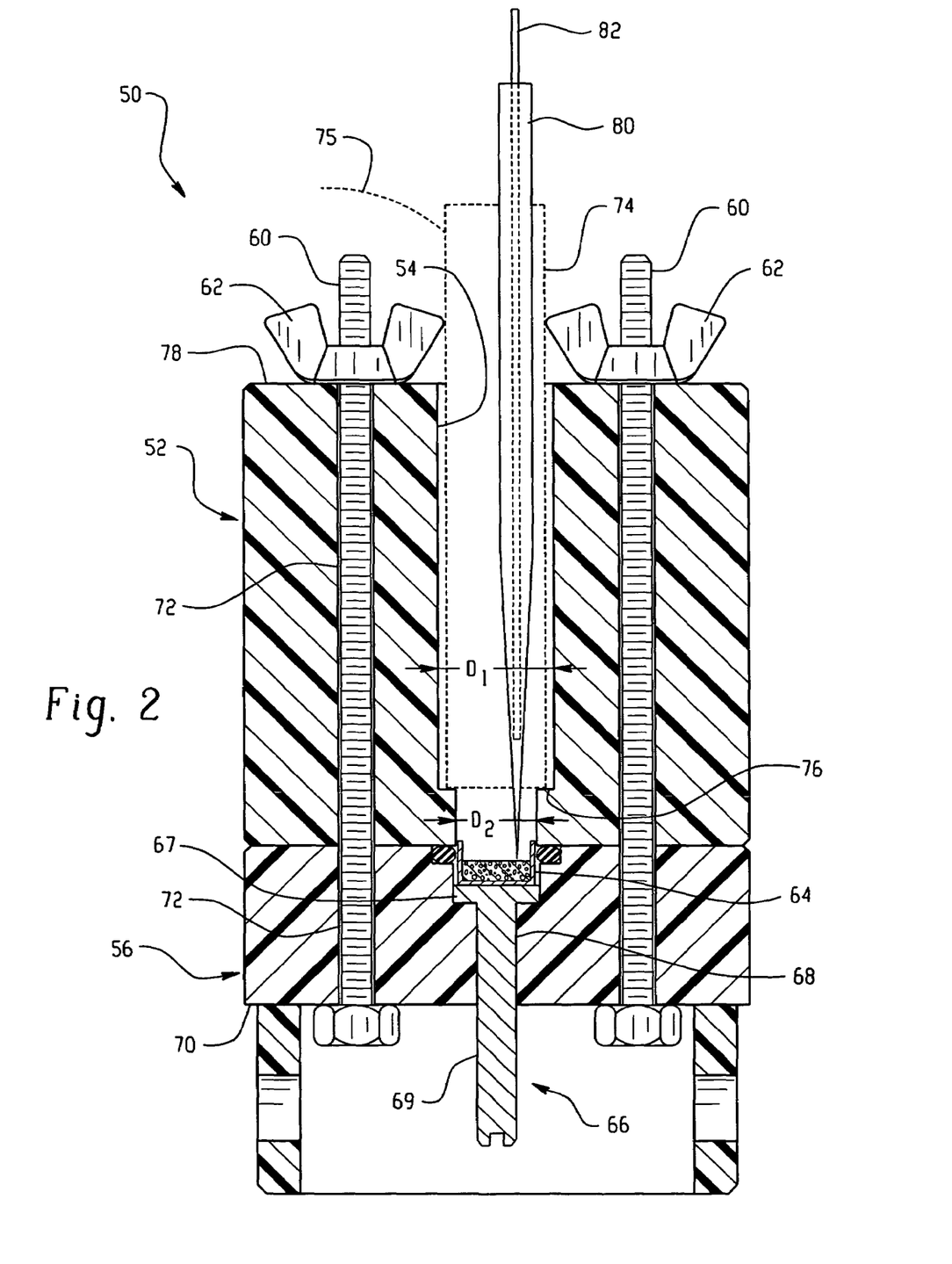
FIG. 2 is a cross sectional drawing of an assembled flooded electrode test apparatus.

To demonstrate the ability of specific iodates to discharge with an average closed circuit voltage greater than 1.0V, a flooded electrode test apparatus was constructed. A cross sectional drawing of an assembled flooded electrode test apparatus is shown in FIG. 2. Test apparatus 50 includes a top portion 52 having a centrally located hole 54 formed therethrough and a bottom portion 56 which has a centrally located recess 58 (see FIG. 3) that aligns with opening 54 when top portion 52 and bottom portion 56 are secured to one another by two bolts 60 and their corresponding wing nuts 62.

Figure 3:
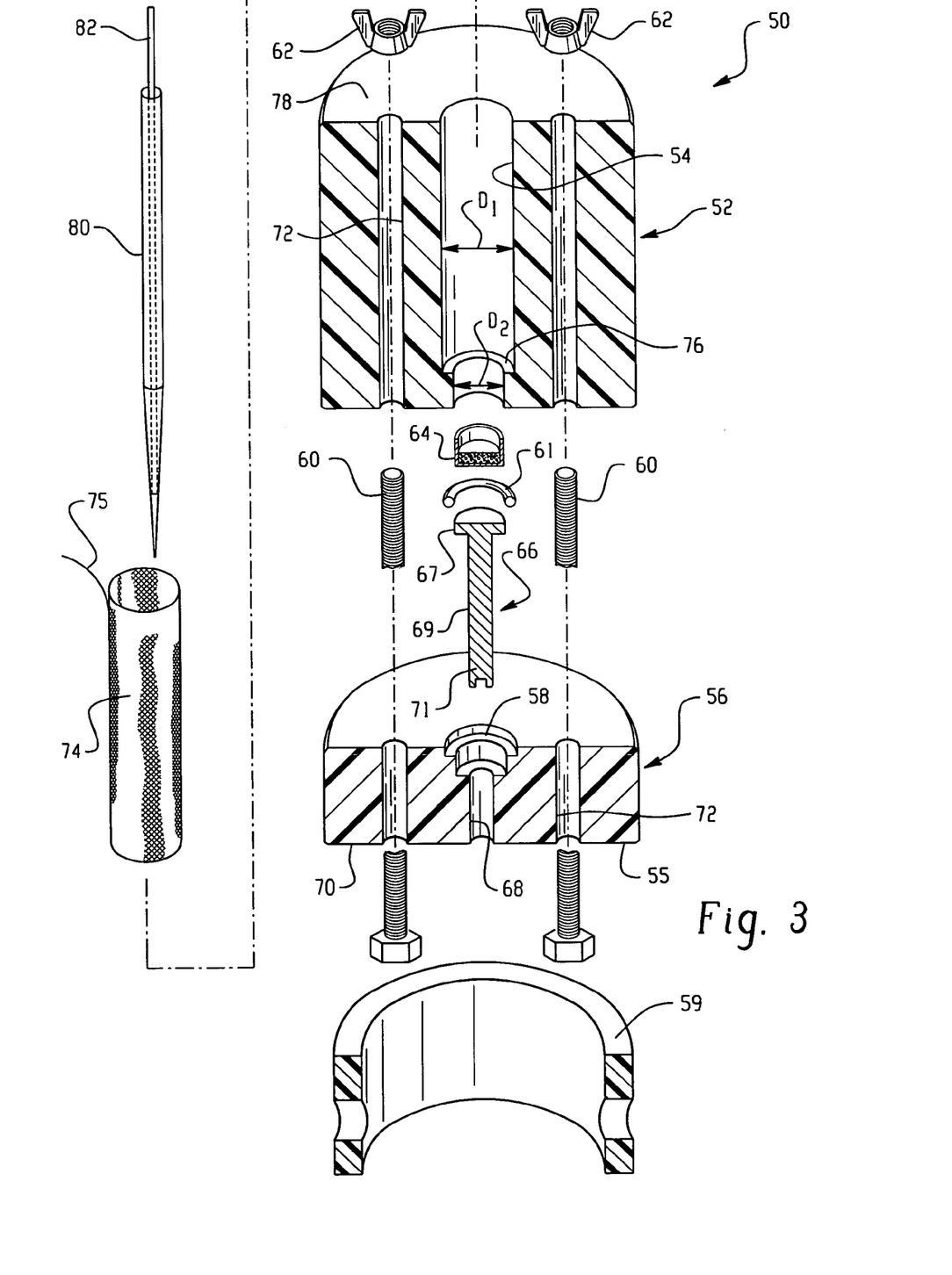
FIG. 3 is an exploded cross sectional view of a flooded electrode test apparatus.

With reference to FIG. 3, which is an exploded view of a flooded electrode test apparatus, the apparatus is assembled in the following manner. First, an electrochemically dischargeable iodate and a catalyst are homogenously mixed together. A 0.5 g quantity of the mixture is then pressed to form a pellet measuring 11 mm in diameter and 2 mm in height. The pellet is then pressed into a shallow, cup shaped metal container 64, measuring 12 mm in diameter and 5 mm in height. A metal connector 66, having a disc shaped contact 67 permanently secured to one end of a rod shaped portion 69, is inserted into and through passageway 68 in bottom portion 56. Free end 71 of rod shaped portion 69 extends beyond the lower surface 55 of bottom portion 56 thereby enabling an electrical connector to be secured to connector 66. Stand 59 is positioned below bottom portion 56. The container contacts the top surface of the disc shaped contact 67 which has been gold plated prior to assembling the flooded electrode test apparatus. The gold plating minimizes contact resistance between the connector and the container when the container with the pellet formed therein is firmly seated in recess 58. O-ring 61 is disposed around the perimeter of container 64 to facilitate the formation of a liquid tight seal between top portion 52 and bottom portion 56 when they are secured to one another. Top portion 52 is then positioned over bottom portion 56 so that the centrally located hole in the top portion aligns with recess 58 in bottom portion 56. Two bolts 60 are then inserted through two openings 72 in top portion 52 and bottom portion 56. Wing nuts 62 are used to secure the top and bottom portions to each other. A tubularly shaped metal cylinder 74, made by coiling a solid nickel strip or mesh into a generally tubular shape having a diameter slightly less than the inside diameter of opening 54, is inserted into opening 54 until the leading end of cylinder 54 rests upon ledge 76 which reduces the first inside diameter $D_1$ of opening 54 to a second smaller inside diameter $D_2$. A portion of cylinder 74 extends above top surface 78 of top portion 52. A pipette 80 having a zinc wire 82 and gelled electrolyte disposed therein is inserted into the cavity defined by the metal cylinder. An aqueous alkaline electrolyte is disposed into the metal cylinder until the level of the electrolyte is slightly below the top surface 78 of the top portion. The quantity of electrolyte must be sufficient to effectively flood the dischargeable material in the container, as well as the pipette via the narrow opening in the leading end of the pipette, and the metal cylinder. Electrical connections are then established between instrumentation used to measure the circuit's voltage and (1) the metal cylinder via tab 75, (2) the metal connector 66 which serves as the dischargeable material's current collector and (3) the zinc wire 82 which serves as a reference electrode. A flooded electrode test apparatus, as described above, was used to evaluate the electrochemical discharge parameters of various mixtures that included an iodate and a catalyst that facilitates reduction of the iodate during discharge.

Figure 4:
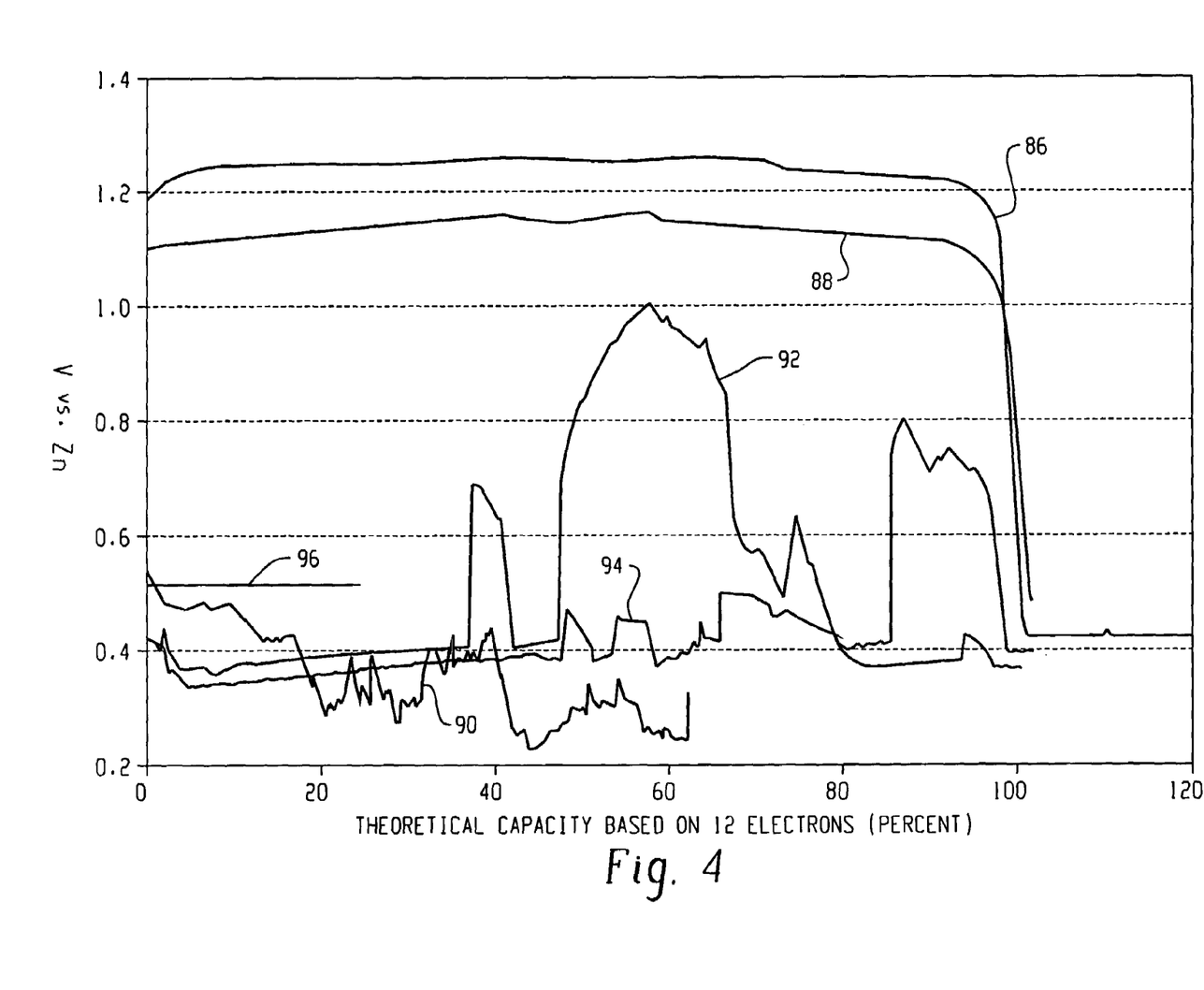
FIG. 4 is a graph showing the discharge curves of strontium iodate with six different additives.

Shown in FIG. 4 are several discharge curves which plot closed circuit voltage versus the theoretical capacity of the strontium iodate which is the electrochemically dischargeable material in the pellet. The theoretical capacity of the strontium iodate is based on a twelve electron exchange. Data for the curves was generated by discharging the pellets in the electrode test apparatus described above. Each discharge curve represents strontium iodate mixed with one of the following catalysts: platinum (curve 86); palladium black (curve 88); silver (curve 90); ruthenium (curve 92); rhodium (curve 94); or graphite (curve 96). The curves were generated by discharging 0.5 g pellets, containing 11 volume percent catalyst, at two milliamps. The strontium iodate's density was 5.0 g/cc and its surface area was approximately 0.5 $m^2$/g. The electrolyte used in the test cell was an alkaline electrolyte having forty weight percent KOH. The curves in FIG. 4 clearly show that when strontium iodate is mixed with either platinum or palladium black, the strontium iodate's average closed circuit voltage is greater than 1.0 V. In contrast, when strontium iodate was mixed with silver or rhodium, the average closed circuit voltage was usually well below 0.8 V. When ruthenium was used as the catalyst, the voltage varied erratically between 0.4 V and 1.0 V. When graphite was used as the catalyst, the average closed circuit voltage was approximately 0.5 V which is well below the functional endpoint of many commercially available battery powered devices.

Figure 5:
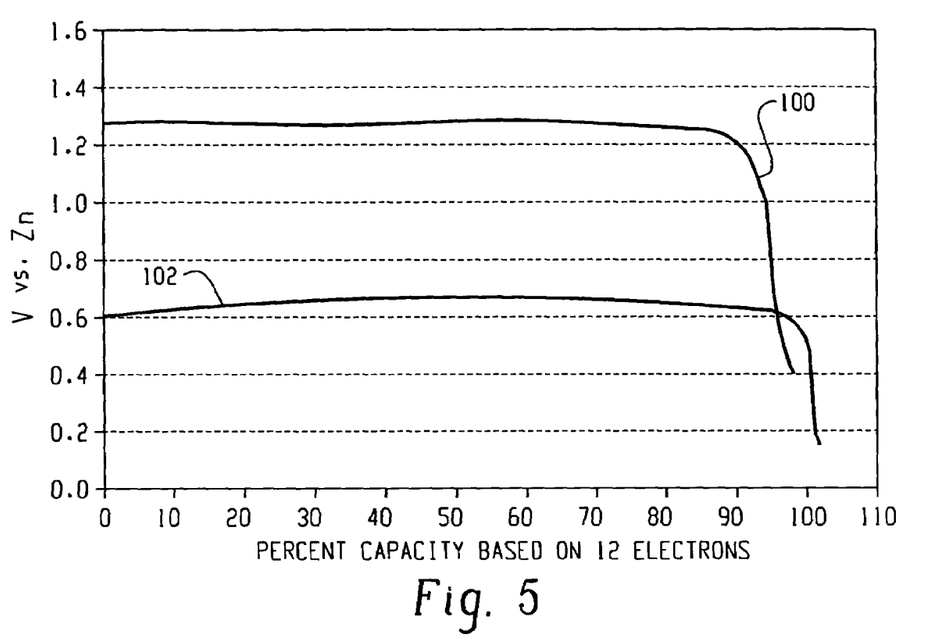
FIG. 5 is a graph showing the discharge curves of strontium iodate with and without a catalyst.

Shown in FIG. 5 are two discharge curves that were generated by discharging a pellet containing strontium iodate at two milliamps in 40% KOH using the electrode test apparatus described above. Curve 100 was produced by discharging a pellet containing strontium iodate combined with 35 volume percent platinum powder. Curve 102 was produced by discharging a pellet containing strontium iodate combined with 35 volume percent graphite powder. The curves clearly show that the use of platinum as the catalyst allowed the strontium iodate to discharge at approximately 1.28 V, which is a useful voltage in many devices, rather than 0.65 V which is the voltage at which the mixture of strontium iodate and graphite discharged.

Figure 6:
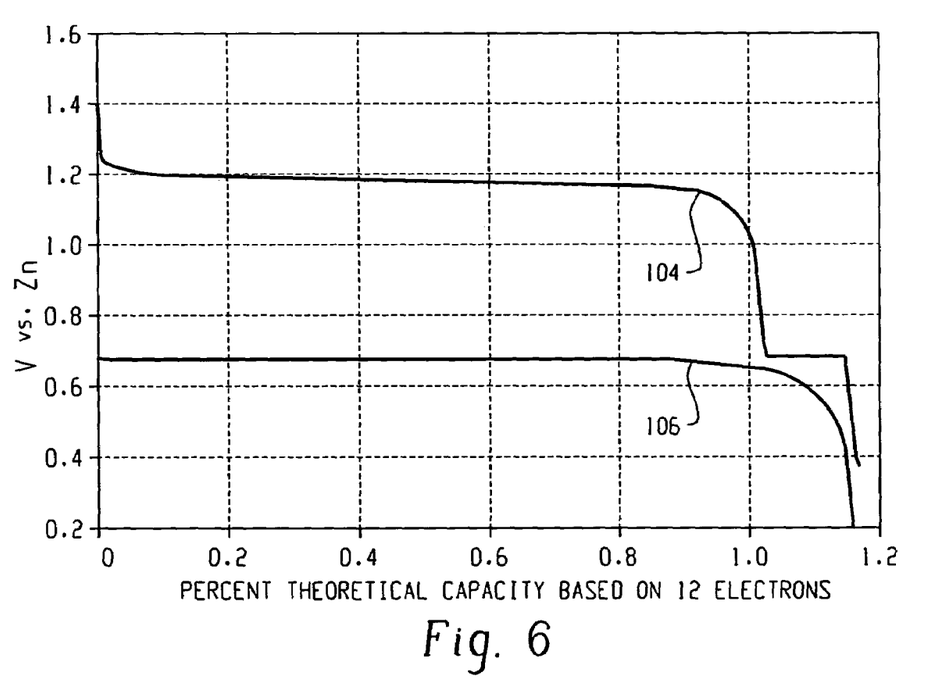
FIG. 6 is a graph showing the discharge curves of lead iodate with and without a catalyst.

FIG. 6 discloses two discharge curves that were generated by discharging a pellet containing lead iodate at two milliamps in 40% KOH using the electrode test apparatus described above. The lead iodate's density was 6.5 g/cc and its BET surface area was approximately 4.0 $m^2$/g. Curve 104 was produced by discharging a pellet containing lead iodate combined with 35 volume percent platinum powder. Curve 106 was produced by discharging a pellet containing lead iodate combined with 35 volume percent graphite powder. The pellet containing the platinum catalyst had an average closed circuit voltage well above 1.15 V while the pellet containing the graphite discharged below 0.70 V. The data clearly shows that the use of platinum as a catalyst enables lead iodate to discharge at an average closed circuit voltage that is substantially higher than the 1.0 V cutoff required by many electronic devices.

Figure 7:
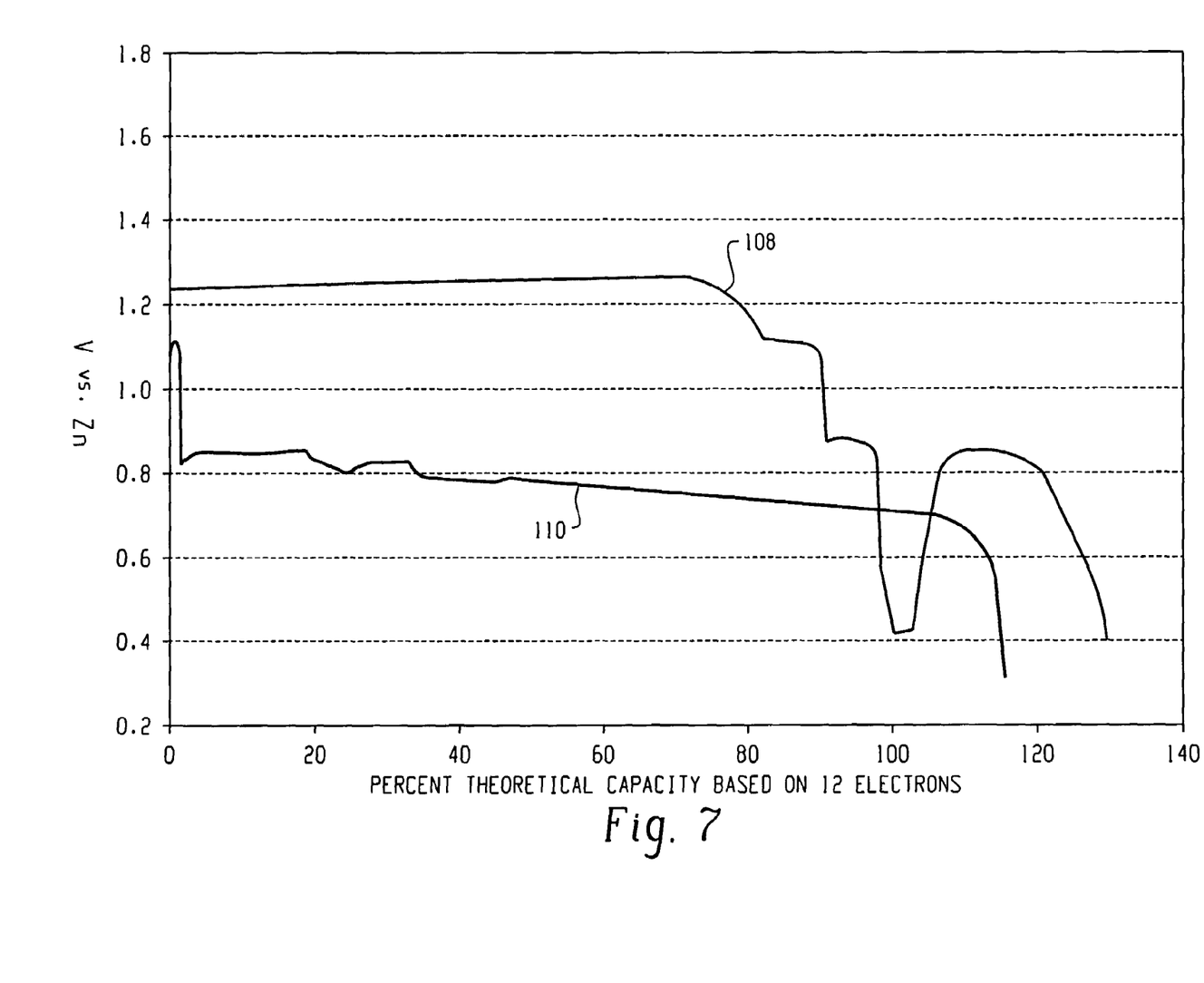
FIG. 7 is a graph showing the discharge curves of copper iodate with and without a catalyst.

The discharge curves in FIG. 7 demonstrate the substantial difference in operating voltage that can be obtained by using platinum, instead of graphite, as the catalyst in a pellet containing copper iodate as the electrochemically active material. In both pellets the quantity of catalyst was 11 volume percent based on the total volume of the pellet. The pellets were discharged at two milliamps in 40 weight percent KOH in the electrode test fixture described above. Curve 108 was obtained by discharging a pellet containing a mixture of copper iodate and platinum powder. Curve 110 was obtained by discharging a mixture of copper iodate and graphite. The pellet with the platinum catalyst discharged above 1.2 V for approximately 75% of its theoretical capacity while the pellet with graphite catalyst discharged below 0.9 V for more than 95% of its theoretical capacity. The data demonstrates that mixing platinum with copper iodate facilitates reduction of the iodate at a voltage greater than 1.0 V.

Catalysts useful in cell of this invention include platinum and palladium black. Platinum powder that has an average BET surface area between 0.1 m²/g and 200.0 m²/g is acceptable. Platinum black that has an average BET surface area between 2.0 m²/g and 100.0 m²/g is preferred A suitable particle size range is 0.2 µm to 2.5 µm. Palladium black that has a particle size range between 1.0 µm and 1.5 µm is acceptable. If desired, the platinum or palladium black may be deposited on a carrier, such as graphite, in order to facilitate the distribution of the platinum or palladium throughout the iodate.

The above description is considered that of the preferred embodiments only. Modifications of the invention will occur to those skilled in the art and to those who make or use the invention. Therefore, it is understood that the embodiments shown in the drawings and described above are merely for illustrative purposes and are not intended to limit the scope of the invention, which is defined by the following claims.

What is claimed is:

1. An electrochemical cell, comprising:
   (a) only two electrodes, a first electrode comprising a first electrochemically active material and a second electrode comprising a second electrochemically active material and a catalyst, wherein said second electrochemically active material consists of one or more iodates or a mixture of one or more iodates and another material selected from manganese dioxide and silver oxide, and said catalyst comprises at least one material selected from the group consisting of platinum and palladium;
   (b) a separator disposed between said electrodes; and
   (c) an electrolyte providing ionic conductivity between said first and second electrodes.

2. The electrochemical cell of claim 1 wherein said iodates have a surface area greater than 0.10 m²/g and less than 100 m²/g.

3. The electrochemical cell of claim 2, wherein said iodates have a surface area greater than 4 m²/g and less than 75 m²/g.

4. The electrochemical cell of claim 1, wherein said catalyst is deposited on a carrier.

5. The electrochemical cell of claim 4 wherein said catalyst has a surface area greater than 0.1 m²/g and less than 200.0 m²/g.

6. The electrochemical cell of claim 5 wherein said catalyst has a surface area greater than 2.0 m²/g and less than 100.0 m²/g.

7. The electrochemical cell of claim 4 wherein the carrier comprises graphite.

8. The electrochemical cell of claim 1 wherein said iodates are selected from the group consisting of lead iodate, strontium iodate, copper iodate, barium iodate, silver iodate, potassium iodate, lithium iodate, ferrous iodate, bismuth iodate, cerium iodate, zinc iodate and calcium iodate.

9. The electrochemical cell of claim 1 wherein said second electrochemically active material comprises a mixture of manganese dioxide and an iodate.

10. The electrochemical cell of claim 1 wherein said second electrode further comprises graphite.

11. The electrochemical cell of claim 10 wherein said catalyst is disposed on said graphite.

12. The electrochemical cell of claim 11 wherein said first electrochemically active material comprises zinc.

13. The electrochemical cell of claim 12 wherein said zinc is comminuted.

14. The electrochemical cell of claim 1 wherein said electrolyte is an aqueous alkaline electrolyte.

15. The electrochemical cell of claim 14, wherein said aqueous alkaline electrolyte comprises potassium hydroxide.

16. The electrochemical cell of claim 15 wherein said concentration of potassium hydroxide is less than 45 weight percent.

* * * * *